United States Patent [19]

Yang

[11] Patent Number: 5,813,450

[45] Date of Patent: Sep. 29, 1998

[54] SUNSHADE FOR CAR BACK WINDOW

[75] Inventor: Ming-Shun Yang, Taipei, Taiwan

[73] Assignee: Formosa Saint Jose Corporation, Taipei, Taiwan

[21] Appl. No.: 838,718

[22] Filed: Apr. 9, 1997

[51] Int. Cl.$^6$ ........................................................ B60J 3/00

[52] U.S. Cl. ...................................... 160/370.23; 160/127

[58] Field of Search ......................... 160/370.23, 370.21, 160/370.22, 84.01, 84.04, 84.05, DIG. 2, DIG. 3, 127; 296/97.7, 97.8, 97.9

[56] References Cited

U.S. PATENT DOCUMENTS

| | | | |
|---|---|---|---|
| 4,758,042 | 7/1988 | Liu | 160/84.04 X |
| 4,775,180 | 10/1988 | Phillips | 160/84.04 |
| 4,805,955 | 2/1989 | Levy | 160/84.04 |
| 4,932,711 | 6/1990 | Goebel | 160/370.23 X |
| 5,044,686 | 9/1991 | Acenbrack | 160/370.23 X |
| 5,201,563 | 4/1993 | Liao | 160/370.23 X |

*Primary Examiner*—David M. Purol

*Attorney, Agent, or Firm*—Erik M. Arnhem

[57] ABSTRACT

Disclosed is a sunshade for car back window for mounting on a deck extending between the back window and a back seat of a car and mainly including two independent but laterally symmetrical folding blinds and a mounting mechanism for locating the two folding blinds at a desired position. The mounting mechanism includes a base, a compression spring, a supporting seat, a rectangular pipe, an adjusting nut, a top cover, and two fragrant cakes. The base has an upwardly projected threaded stem which extends through the compression spring and the supporting seat into the adjusting nut such that the compression spring and the supporting seat are assembled to the base to form an integral unit. Turning the adjusting nut changes the height of the supporting seat relative to the base, prevent the sunshade from striking articles on the mounting deck. The supporting seat has two symmetrical compartments for accommodating the two fragrant cakes and a long recess between the two compartments for supporting the rectangular pipe. With these arrangements, the sunshade can block sunshine shining on the back window while providing fragrance to the car.

4 Claims, 4 Drawing Sheets

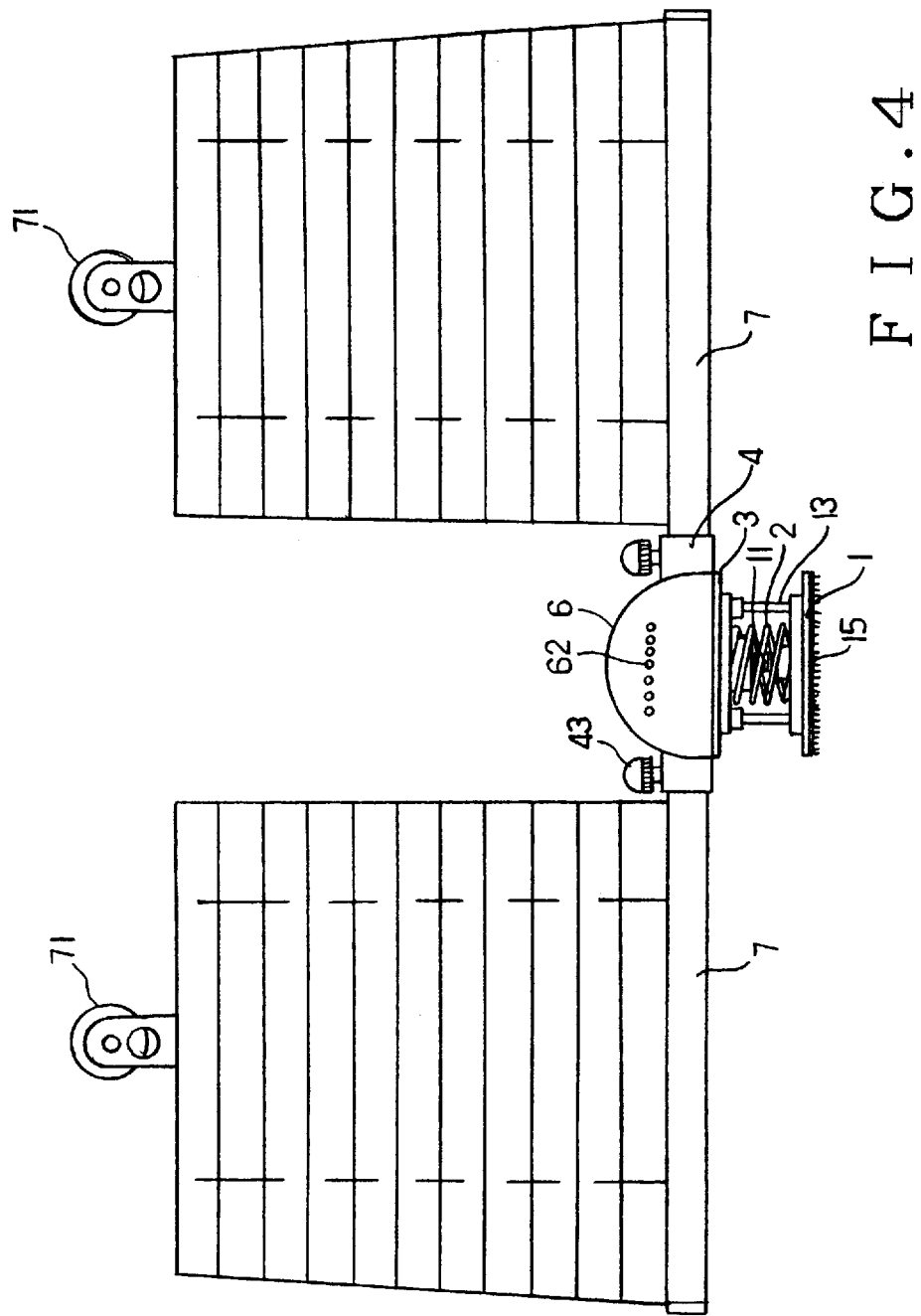

SUNSHADE FOR CAR BACK WINDOW

BACKGROUND OF THE INVENTION

To prevent hot sunshine from directly passing through the car windows and making the interior of car unduly hot, there are various types of car blinds or sunshades commercially available on the market to block the sunshine. There are also a variety of sunshade products particularly for use on car back windows, such as heat insulation paper, blinds, venetian blinds, etc. All of these sunshade products have one or more disadvantages in their applications. For example, the heat insulation paper will leave ugly specks on the window glass after the paper is peeled; and the installation of blinds or venetian blinds in a car will require many tools considerable time and extensive labor. Particularly, the mounting of such blind and venetian blind is frequently hindered by the presence of car stereo, speaker cabinets, etc. fixedly mounted on and projecting upwardly from the deck extending between the back seat and the back window.

SUMMARY OF THE INVENTION

It is therefore a primary object of the present invention to provide a sunshade for a car back window which can be easily assembled and installed in a car to achieve the purpose of preventing sunshine from directly passing through the back window glass.

The sunshade for a car back window according to the present invention is locatable on a deck extending between the back window and the back seat the sunshade includes two independent but laterally symmetrical folding blinds and a mounting means for locating the two folding blinds at a desired position. The mounting means includes a base, a compression spring, a supporting seat, a rectangular pipe, an adjusting nut, a top cover, and two fragrant cakes. The base has an upwardly extending threaded stem which extends through the compression spring and the supporting seat, such that the compression spring and the supporting seat are assembled to the base to form an integral unit. The turning of the adjusting nut changes the height of the supporting seat relative to the base, to prevent the sunshade from striking any articles on the mounting deck. The supporting seat has two symmetrical compartments for accommodating the two fragrant cakes and a long recess between the two compartments for supporting the rectangular pipe. With these arrangements, the sunshade of the present invention can block sunshine shining on the back window while supplying an aromatic fragrance to the car interior space.

BRIEF DESCRIPTION OF THE DRAWINGS

FIG. 4 is an elevational view of the sunshade of the present invention in use.

DETAILED DESCRIPTION OF THE PREFERRED EMBODIMENTS

Figure 1:
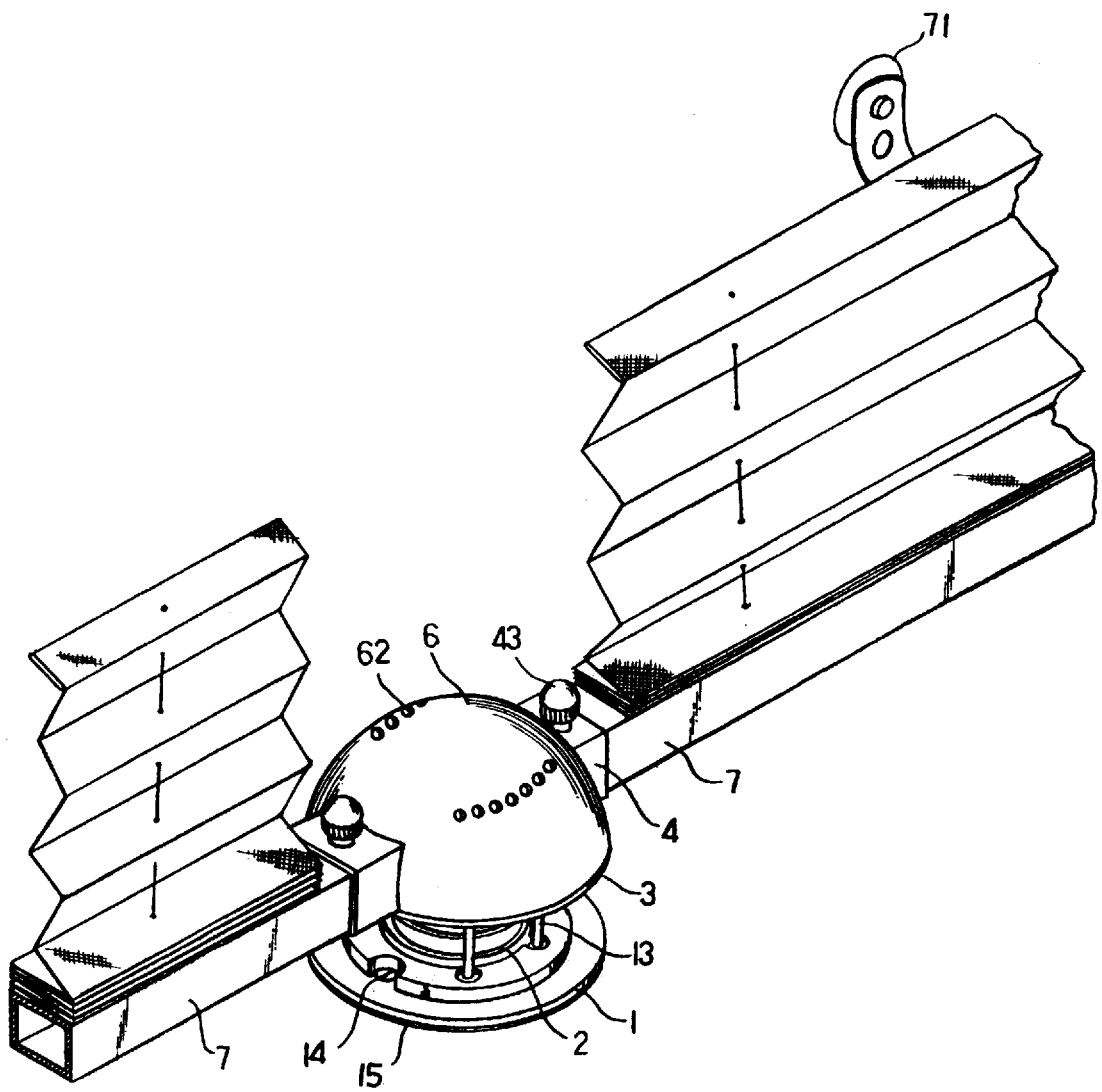
FIG. 1 is a perspective view showing the sunshade for a car back window according to the present invention.
Figure 2:
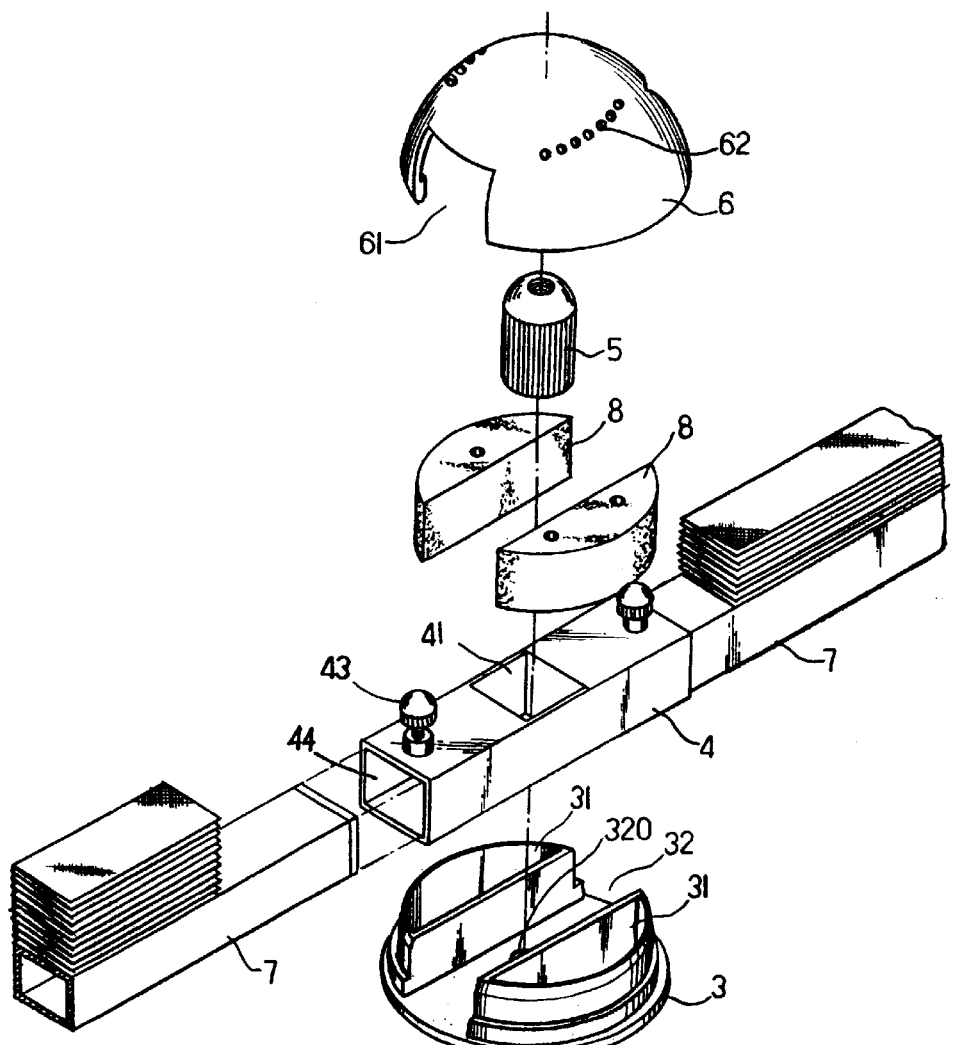
FIG. 2 is an exploded perspective of the sunshade depicted in FIG. 1.

Please refer to FIGS. 1, 2, and 4. The present invention relates to a sunshade for car back window and mainly includes two independent but laterally symmetrical folding blinds (7) and a mounting means for stably locating the two blinds (7). Each folding blind (7) is provided with a suction cup (71) for firmly attaching the top of the blind (7) to a car back window glass by means of suction. The mounting means is mounted on a deck extending between the back window and a back seat of the car.

Figure 3:
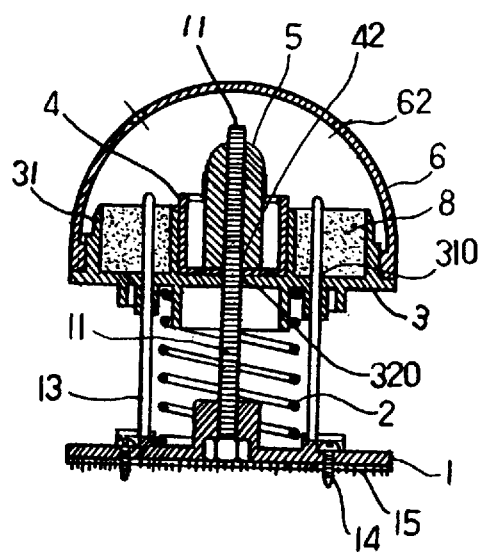
FIG. 3 is a sectional view of a mounting means used in practice of the present invention.

Please refer to FIGS. 1, 2 and 3 for the structure of the mounting means of the present invention. As shown in the drawings, the fixing means includes a base (1), a compression spring (2), a supporting seat (3), a pipe or sleeve (4) having rectangular cross section, an adjusting nut (5), a top cover (6), and two pieces of fragrant cakes (8).

The base (1) is in the form of a round plate. A threaded stem (11) projects upwardly from a central top surface of the base (1). An annular recess (12) is formed on the top surface of the base (1) around the threaded stem (11) for receiving one end of the compression spring (2) therein. Three guiding rods (13) adjacent to and spaced around an outer periphery of the annular recess (12) project upwardly from the base (1). Two mounting holes (14) are formed on the base (1).

The supporting seat (3) is in a position vertically overlying to the base (1). Two diametrically opposite sides on a top of the supporting seat (3) are provided with two symmetrical compartments (31) for receiving the two fragrant cakes (8) therein. A diametrical recess (32) is accordingly formed between the two symmetrical compartments (31) to support the rectangular pipe (4) thereon.

As shown in FIGS. 2 and 3, the compartment (31) of the supporting seat (3) is provided therein with a through hole (310) for one of the guiding rods (13) extending from the base (1). The guiding rods (13) extend into the compartments (31) and through the fragrant cakes (8). A through hole (320) is centered at the long recess (32) of the supporting seat (3) for the threaded stem (11)As shown in the drawings, when the compression spring (2) has its bottom end positioned in the annular recess (12) of the base (1), its top end shall press against a bottom side of the supporting seat (3) and elastically supports and pushes the supporting seat (3) upward. At this point, the threaded stem (11) and the guiding rods (13) can be extended into the long recess (32) and the compartments (31), respectively, via the through holes (320) and (310), respectively. Then, the rectangular pipe (4) can be mounted onto the long recess (32).

As shown in FIGS. 2 and 3, the rectangular pipe (4) has two ends forming sleeves (44) for connecting the folding blinds (7) of the present invention thereto. When lower frames of the two folding blinds (7) are separately inserted into the sleeves (44), they are locked thereto by tightening two set screws (43) threaded into upper surfaces of the rectangular pipe (4). The rectangular pipe (4) is formed at a top central portion with a square opening (41) to accommodate the adjusting nut (5). A bottom hole (42) is formed on the pipe (4) facing a center of the square opening (41) for the threaded stem (11) to extend therethrough. As shown in the drawings, the threaded stem (11) passes through the through hole (320) of the supporting seat (3) and the bottom hole (42) of the rectangular pipe (4), The adjusting nut (5) can be put into the square opening (41) to screw onto the threaded stem (11) projected from the bottom hole (42), whereby, the adjusting nut (5), the rectangular pipe (4), the supporting seat (3), and the compression spring (2) all are firmly assembled to the base (1) to form an integral unit without the risk of becoming loosened from one another.

When the sunshade of the present invention is installed on the deck behind the car back seat to block sunshine shining on the back window, the deck is free of any article the, such as a car stereo or speaker cabinets. The adjusting nut (5) can be turned clockwise to force the supporting seat (3) downward to press against the compression spring (2). The compressed spring (2) in turn causes the supporting seat (3), the rectangular pipe (4) and the sunshade blinds (7) to move downward at the same time. When the deck on which the sunshade of the present invention is to be mounted has projected articles fixed thereto, such as a car stereo or speaker cabinets, the adjusting nut (5) can be turned counterclockwise to move upward which in turn allows the compression spring (2) to extend and pushes the supporting seat (3) and accordingly, the rectangular pipe (4) and the blinds (7) to move upward, leaving the articles below the lower frames of the blinds (7).

The top cover (6) as shown in FIGS. 1, 2, and 3 is formed on its wall at two diametrically opposite sides with two symmetrical openings (61) mated to the rectangular pipe (4), such that when the top cover (6) is put onto the supporting seat (3), the cover can engage seat 3 as shown in FIG. 3. The top cover (6) covering over the supporting seat (3) also gives the mounting means of the sunshade of the present invention a complete and beautiful appearance. Two symmetrical lines of ventilation holes (62) are provided on the top cover (6) so that pleasant odors from the fragrant cakes (8) may escape from the holes (62) into the car, providing the car with freshening and fragrant air.

To install the sunshade of the present invention on the deck behind the back seat, a fastening means, such as a velcro tape (15), can be attached to a bottom surface of the base (1) to directly secure the base (1) to a cloth surface of the deck. Alternatively, screws can be used to thread through the fixing holes (14) on the base (1) to fixedly connect the sunshade of the present invention to the deck in a more stable manner. It can be seen that the installation of the present invention does not require many tools, nor will the interior decoration of the car be damaged. The assembling and the installation of the present invention are simple and convenient. Particularly, the folding blinds (7) can be freely adjusted in their height. Moreover, blinds (7) with different widths can be selectively used to adapt to different cars.

With the above arrangements, the sunshade for car back window of the present invention is simple in the assembling and installation, and provides fragrance to make the car more pleasantly comfortable.

What is claimed is:

1. A sunshade for blocking light rough passing through a car, rear window, comprising:

two independent but laterally symmetrical folding blinds (7), a mounting means for supporting said blinds on a deck at the rear window of a car, and a cover for said mounting means;

said mounting means comprising a base (1) having an upwardly extending threaded stem (11) and plural upwardly extending guide rods (13); a support seat (3) overlying said base; a compression spring (2) encircling said threaded stem between said base and said support seat; and a rectangular sleeve (4) positioned flatwise on said seat such that opposite ends of said sleeve extend in opposite directions beyond said seat;

said sleeve having a central opening accommodating said threaded stem, and a nut threaded onto said stem to secure said sleeve to said seat;

said seat comprising two separate fragrance compartments (31) located alongside said sleeve for containing solid fragrance materials; said seat being slidably supported on said guide rods for vertical adjustments, whereby said seat can be raised or lowered by manually rotating said nut on said threaded stem;

each said folding blind comprising a frame element telescoped into an end of said sleeve, whereby said folding blinds are symmetrically arranged on said mounting means;

said cover being attachable to said support seat so as to overlie said rectangular sleeve and said fragrance compartments; said cover having ventilation holes therein for allowing fragrant vapors to escape from said fragrance compartments.

2. The sunshade of claim 1, wherein said guide rods extend into said fragrance compartments.

3. The sunshade of claim 1, wherein said central opening in said sleeve has a greater dimension than said nut, whereby said nut is accommodated within said sleeve.

4. The sunshade of claim 1, and further comprising a set screw (43) for releasably locking each said telescoped frame element to said sleeve.

* * * * *